(12) United States Patent
Veto et al.

(10) Patent No.: US 10,589,878 B2
(45) Date of Patent: Mar. 17, 2020

(54) ADDITIVELY MANUFACTURED REINFORCED STRUCTURE

(71) Applicant: THE BOEING COMPANY, Chicago, IL (US)

(72) Inventors: Christopher C. Veto, Long Beach, CA (US); Gary David Grayson, Issaquah, WA (US); Victor John Barackman, Costa Mesa, CA (US)

(73) Assignee: THE BOEING COMPANY, Chicago, IL (US)

( * ) Notice: Subject to any disclaimer, the term of this patent is extended or adjusted under 35 U.S.C. 154(b) by 438 days.

(21) Appl. No.: 15/375,640

(22) Filed: Dec. 12, 2016

(65) Prior Publication Data
US 2018/0229863 A1     Aug. 16, 2018

(51) Int. Cl.
| F17C 1/08 | (2006.01) |
| B64G 1/40 | (2006.01) |
| B33Y 80/00 | (2015.01) |
| F17C 13/00 | (2006.01) |

(52) U.S. Cl.
CPC .............. B64G 1/402 (2013.01); B33Y 80/00 (2014.12); F17C 1/08 (2013.01); F17C 13/008 (2013.01); F17C 2201/0147 (2013.01); F17C 2203/012 (2013.01); F17C 2209/21 (2013.01); F17C 2270/0194 (2013.01)

(58) Field of Classification Search
CPC .......... B64G 1/402; F17C 1/08; F17C 13/008; F17C 2201/0109; F17C 2201/0147; F17C 2201/032
USPC ....................................................... 220/592
See application file for complete search history.

(56) References Cited

U.S. PATENT DOCUMENTS

| 3,661,294 A * | 5/1972 | Pearson ............... B65D 90/029 220/590 |
| 7,900,434 B2 | 3/2011 | Grayson et al. |
| 8,281,566 B2 | 10/2012 | Grayson et al. |
| 2013/0048646 A1* | 2/2013 | Kataoka ................... F16J 12/00 220/581 |
| 2016/0061381 A1 | 3/2016 | Kotliar |

FOREIGN PATENT DOCUMENTS

| EP | 3009344 A1 | 4/2016 |
| FR | 3025491 A1 | 3/2016 |

OTHER PUBLICATIONS

Extended Search Report for EP Application No. 17199094.8 dated May 14, 2018.

* cited by examiner

*Primary Examiner* — King M Chu
(74) *Attorney, Agent, or Firm* — Marshall, Gerstein & Borun LLP

(57) ABSTRACT

A grid stiffened structure which includes a wall which extends in a direction transverse relative to a plane and an elongated rib connected along an elongated dimension of the rib to the wall such that the elongated rib extends along the wall and forms an angle with an axis which extends in a direction perpendicular to the plane. The elongated rib defines a free sidewall which extends from the wall positioned on a first side of the elongated rib and extends in a direction about the elongated rib and transverse to the elongated dimension to the wall positioned on a second side of the elongated rib. The wall and the elongated rib are constructed of a plurality of layers of material which extend in a direction transverse to the axis.

22 Claims, 10 Drawing Sheets

ADDITIVELY MANUFACTURED REINFORCED STRUCTURE

This disclosure was made with Government support under contract number hr0011-14-9-0005 awarded by Defense Advanced Research Projects Agency. The Government has certain rights in this disclosure.

FIELD

The present disclosure relates to providing rigidity to a structure, and more particularly, rigidity to a structure fabricated from additive manufacturing to resist buckling from a compression load and/or to resist hoop stress under internal pressure load.

BACKGROUND

Grid stiffened structures provide favorable rigidity characteristics in resisting buckling from a compression load and/or resist hoop stress under internal pressure load. Grid stiffened structures typically include webs, walls or shells, hereinafter referred to as wall, supported by a grid lattice of reinforcement members, such as ribs, stiffeners or stringers, which are positioned across the wall. These stiffeners or stringers form a boundary shape on the wall to provide desired structural reinforcement. One example of a grid stiffened structure is an iso-grid structure. The iso-grid structure has the reinforcement stiffeners or ribs form a triangular boundary shape formation on the wall. The triangular pattern of ribs or stiffeners is efficient and retains rigidity while saving material and weight. The iso-grid structure acts much like an isotropic material with equal properties measured in any direction.

Another example of a grid stiffened structure, which includes a rectangular boundary shape formed by ribs or reinforcement members which extends across the wall, is referred to as an ortho-grid structure. An ortho-grid structure is a variation of an iso-grid structure and is not isotropic but has different properties than triangular boundary shaped pattern of stiffeners or ribs positioned across the wall. Ortho-grid structures are not isotropic but have different properties from different angles but in certain applications can be used in place of iso-grid structures. Other grid stiffened structures are available which have stiffeners or ribs forming other boundary shaped configurations which are positioned across the wall structure being reinforced.

Use of subtractive manufacturing, where a metal sheet, for example, is machined to remove material and to form grid reinforcement formations on a wall is an expensive method of manufacturing. Other expensive fabrication techniques can be employed which would include fabricating the stiffeners or ribs separately and apart from the wall structure and welding the separate reinforcement members to the wall. Additional expensive methods have been used such as utilizing composite material which includes expensive tooling.

Grid stiffened structures which provide stiff, high strength and light weight constructions have been expensive to fabricate and as a result have been limited for use in general aerospace applications which experience takeoffs, cruising and landings and spaceflight applications which experience launch, station keeping, entry, descent and landings. With grid stiffened structures, having stiffness, high strength and lightweight characteristics along with providing a sealed wall to an outside of a structure, these structures have been useful for application with such items as a pressurized propellant tank for rockets and which are advantageous over a monocoque construction.

As a result, there is a chief interest in constructing grid stiffened structures which provide needed stiffness, high strength and lightweight characteristics for structures to resist buckling from compression loads and resist hoop stress pressure loads at a lower cost than currently is incurred in fabricating these grid stiffened structures. Typically, as mentioned, subtractive manufacturing measures are used where sheet metal is milled, portions are formed or otherwise hammered and welded in fabricating the grid stiffened structures. Composite constructions have been used but include expensive tooling, as previously mentioned. There is a need to achieve less expensive fabrication processes for these stiffened grid structures with the use of Additive Manufacturing ("AM") or otherwise referred to as 3-D printing so as to avoid expensive milling, welding and/or tooling.

However, there are limitations with use of AM with use of 3-D printing fabrication of structures, in particular, with respect to overhang of the material being applied to form the structure with respect to a vertical axis. For example, where the structure will itself have a vertical or upright section, such as with a more elongated pressurized propellant vessel for a rocket, the ribs or stiffeners that would form a square or rectangular boundary shape with respect to the wall could not be AM fabricated. If the rib structure was accessible the use of expensive removable support structures (i.e. breakdown tooling) for constructing the rib would be required.

The installation of the support structures and dismantling of the support structures if practical or even possible along with the employment of an expensive tilt-table assembly if needed, would require an additional expense in fabrication of, for example, a pressurized propellant vessel. There is a need to utilize conventional AM printing methods be able to fabricate grid stiffened structures in a vertical direction so as to construct, for example, pressurized vessels or portions thereof. Vessels that will resist aforementioned buckling compressive force and hoop stress pressure without employment of costly steps associated with such 3-D printing or otherwise avoiding use of printing a flat sheet and rolling the sheet.

SUMMARY

An example includes a grid stiffened structure which includes a wall which extends in a direction transverse relative to a plane and an elongated rib connected along an elongated dimension of the rib to the wall such that the elongated rib extends along the wall and forms an angle with an axis which extends in a direction perpendicular to the plane. The elongated rib defines a free sidewall which extends from the wall positioned on a first side of the elongated rib and extends in a direction about the elongated rib and transverse to the elongated dimension to the wall positioned on a second side of the elongated rib. The wall and the elongated rib are constructed of a plurality of layers of material which extend in a direction transverse to the axis.

Another example includes a vessel with grid stiffened structure which includes a wall defining a cylindrical shape, a first curved wall secured to the first end of the wall and a second curved wall secured to a second end of the wall. The first curved wall defines a first opening for fluid to enter the vessel and the second curved wall defines a second opening for fluid to exit the vessel. A plurality of elongated ribs wherein each elongated rib is connected to the wall along a length dimension of each of the plurality of elongated ribs. The plurality of elongated ribs comprise a plurality of sets of four elongated ribs wherein each set forms within the four elongated ribs a parallelogram boundary along the wall and the wall and the plurality of elongated ribs are constructed of a plurality of layers of material which extend in a direction transverse to a length direction of the wall. A plurality of first transition stiffener members each comprises a first wall member which is connected to and positioned to extend along a first end portion of the wall wherein each first stiffener member forms a tear drop shape boundary within the first wall member along the first end portion of the wall. A plurality of second transition stiffener members each includes a second wall member which is connected to and positioned to extend along a second end portion of the wall, wherein each second transition stiffener member forms a tear drop shape boundary within the second wall member along the second end portion of the wall. A plurality of first stiffener members are connected to and positioned to extend along the first curved wall wherein at least one of the plurality of first stiffener members includes at least one first wall member connected to the first curved wall which forms a boundary shape with the first curved wall. A plurality of second stiffener members are connected to and positioned to extend along the second curved wall and around the second opening, wherein at least one of the plurality of second stiffener members includes at least one second wall member connected to the second curved wall which forms a boundary shape with the second curved wall.

The features, functions, and advantages that have been discussed can be achieved independently in various embodiments or may be combined in yet other embodiments further details of which can be seen with reference to the following description and drawings.

DESCRIPTION

Figure 1:
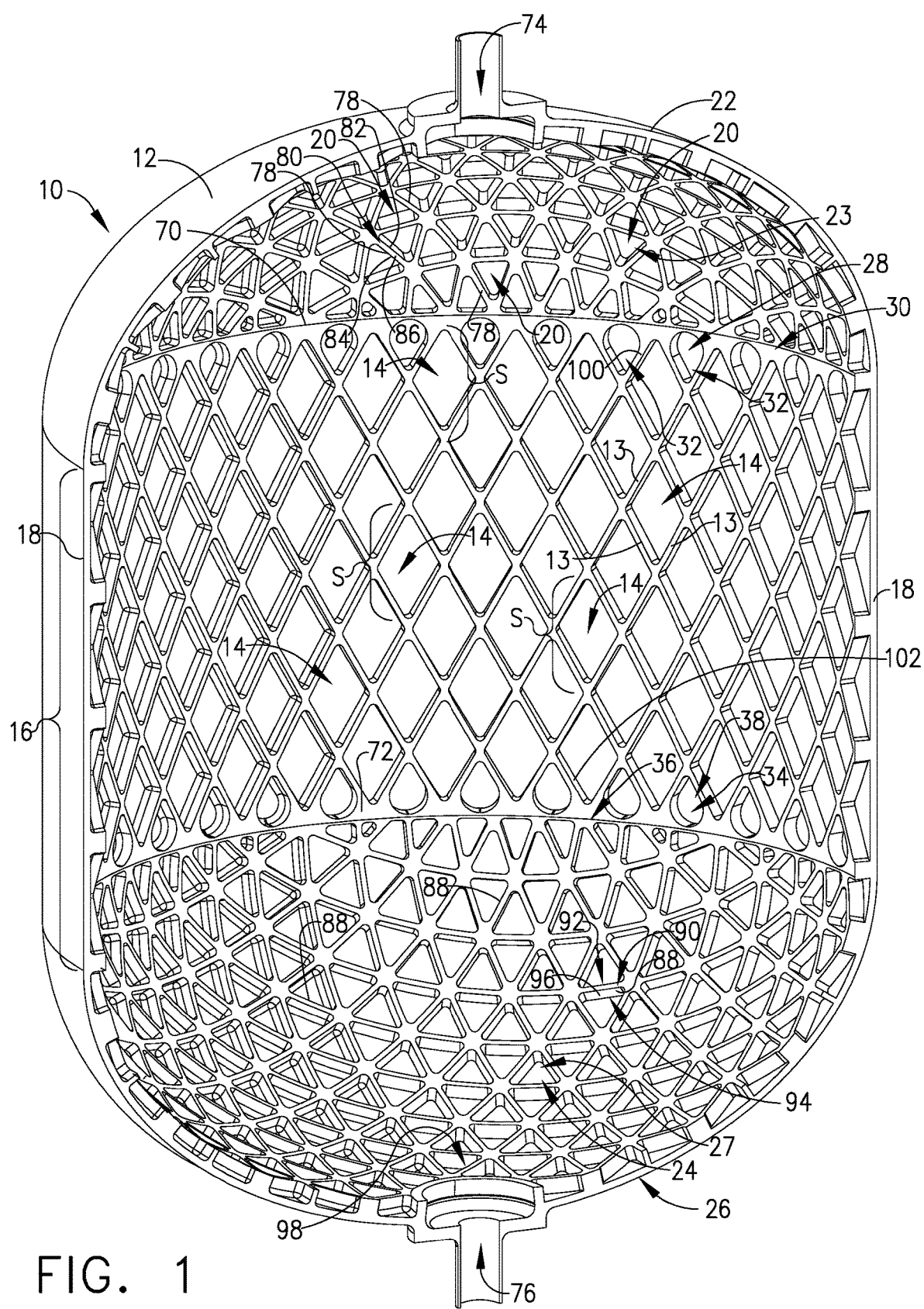
FIG. 1 is a perspective cross section view of a vessel with a grid stiffened construction which is constructed from a 3-D printer.

In referring to FIG. 1, an example is shown of a grid stiffened structure 10 having different configurations of stiffeners or ribs or referred to as Juglan Genus Ribs ("JGR") positioned along the structure and fabricated into the form of a pressurized fuel propellant vessel 12. Grid stiffened structure 10 provides vessel 12 with resistance to buckling with respect to compression loads and hoop stress resistance to pressure loads. As can be seen in this example, grid stiffened structure 10 utilizes three different configurations of closed boundary shapes of reinforcement members or stiffeners or ribs secured to and positioned on and along a wall which will be discussed in more detail herein.

In this example, a plurality of elongated ribs 13 or referred to as reinforcement members or JGRs are shown in FIG. 1. Four elongated ribs 13 form a parallelogram boundary shape 14, which in other examples of grid stiffened structure 10 can include rhombus or diamond shapes. The parallelogram boundary shape 14 is positioned within the four elongated ribs 13 which are connected to and positioned along cylindrical shape 16 of wall or outside wall 18. A second configuration of the three boundary shapes are formed with the use of a plurality of first stiffener members 20, or referred to as reinforcement members or JGRs, which are connected to and positioned along first curved wall 22 wherein three first stiffener members 20, in this example, form an equilateral triangle boundary shape 23 within three first stiffener members 20. The first stiffener members 20 and first curved wall 22 form an iso-grid construction in this example. The second configuration of the three boundary shapes also in this example includes employment of a plurality of second stiffener members 24, or referred to as reinforcement members or JGRs, connected to and positioned along second curved wall 26 wherein three second stiffener members 24 form an equilateral triangle boundary shape 27 within three second stiffener members 24. The second stiffener members 24 and second curved wall 26 also form an iso-grid construction in this example.

A third configuration of boundary shapes are formed with the use of a plurality of first transition stiffener members 28, or referred to as reinforcement members or JGRs, connected secured to and positioned along first end portion 30 of cylindrical shape 16 of wall 18. Each first transition stiffener member 28 forms a tear drop shape boundary 32 within each first transition stiffener member 28. The third configuration of the three boundary shapes, also in this example, includes employment of a plurality of second transition stiffener members 34, or referred to as reinforcement members or JGRs, connected to and positioned along second end portion 36 of cylindrical shape 16 of wall 18. Each second transition stiffener member 34 forms a tear drop shape boundary 38 within each second transition stiffener member 34.

The various grid reinforcement construction configurations mentioned above will be discussed in more detail herein. This grid stiffened structure 10 of vessel 12 provides the beneficial strength and lightweight construction as well as resistance to buckling to compression loading and resistance to hoop stress pressure loading. The configurations of boundary shapes can be position on either side of wall 18 such as with respect to the construction of vessel 12 positioning the boundary shapes of grid stiffened structure 10 on an inside or outside of vessel 12. The configuration of the grid stiffened structure 10 of vessel 12, an example of which is shown in FIG. 1, permits additive manufacturing of vessel 12 as a single piece structure providing significant production cost savings. Alternatively, three sections of grid stiffened structure 10 of vessel 12 including the first and second curved walls 22, 26 along with wall 18 can be separately printed and welded to wall 18 to also provide a significant cost savings. In the instance of a more spherical vessel 12 first and second curved walls 22, 26 can be also be printed as a single piece with the use of removable supports or welded together.

Known additive manufacturing technology can be selectively employed such as Direct Energy Deposition (DEP), Electron Beam Melting (EMB), Powder Directed Energy Deposition (PDED), Laser Engineering Net Shape (LENS), Laser Metal Deposition-powder (LMD-p), Laser Metal Deposition-wire (LMD-w) and Electron Beam Additive Manufacturing (EBAM) along with a wide variety of desired metallic materials such as lithium-aluminum, any grade of titanium alloy including Ti-6A1-4V, any copper alloy, any Inconel alloy, etc. which can be employed in fabricating grid stiffened structure 10 and vessel 12. Since this 3-D printing technology is typically limited to printing overhang of material of up to fifty three degrees (53°) relative to a vertical direction without requiring support to the printed structure, parallelogram boundary shape 14 on cylindrical shape 16 of wall 18 can be constructed so as not to require an overhang in excess of fifty three degrees (53°). As a result, parallelogram boundary shape 14 formed by elongated ribs 13 permits the fabricator to use additive manufacturing for fabricating cylindrical shape 16 of wall 18 with elongated ribs 13 connected thereto in fabricating grid stiffened structure 10. This parallelogram configuration facilitates the fabricator to assemble items such as vessel 12 with continuous 3-D printing technology as a single piece structure dramatically attenuating the cost of fabricating vessel 12 in contrast to subtractive or composite fabrication methodology.

Similarly, in this example, first transition stiffener members 28, as shown in FIG. 1, which forms tear drop shape boundary 32 is selected to be positioned at first end portion 30 of cylindrical shape 16 of wall 18. Tear drop shape boundary 38 of second transition stiffener member 34 are selected to be positioned at second end portion 36 of cylindrical shape 16 of wall 18. This tear/rain drop boundary shape reinforcement configuration provides the needed strength along first and second end portions 30, 36 as well as a lightweight construction. In addition, the tear drop shape boundaries 32, 38 configuration also facilitates the fabricator to utilize continuous 3-D printing to fabricate cylindrical shape 16 of wall 18 as well as entire vessel 12 as a singular piece dramatically reducing the cost of fabricating vessel 12. This singular 3-D printing construction permits vessel 12 to be constructed at a significantly lower cost than other fabrication methods such as subtractive of composite fabrication methodology. Alternatively, at a significant cost savings over other fabrication methodologies, vessel 12 can be also fabricated in three separate pieces. This would include 3-D printing separately cylindrical shape 16 of wall 18 with elongated ribs 13 and first and second transition stiffener members 28, 34 from first and second curved walls 22, 26 which would be fabricated separately with first and second stiffener members 20, 24, respectively. First and second curved walls 22, 26 with first and second stiffener members 20, 24 respectively would be welded, be it conventional or linear friction, to cylindrical shape 16 wall 18 with elongated ribs 13 and first and second transition stiffener members 28, 34 forming vessel 12.

In this example, first and second curved walls 22 and 26 can take on a configuration such as a square root dome, hemi-sphere or other curved configurations. A square root dome is a low-profile dome construction in which a major-to-minor axis ratio is greater than the square root of 2 and offers possibilities for maximizing the volume of a tank or vessel for a given length or for a shorter overall vehicle length for a given propellant volume. It can also minimize the length of inter-stage segments that join tanks or vessels together, thus contributing to a lower overall vehicle weight.

Second curved wall 26 provides a profile along with plurality of second stiffener member 24 such that any overhang from printing will not exceed fifty three degrees (53°). The example of second stiffener members 24 described above included second stiffener members 24 forming equilateral triangle boundary shape 27, as seen in FIG. 1. The geometry of second stiffener members 24 can include in association with second curved wall 26 one of a variety of stiffener member configurations including for example, iso-grid, ortho-grid, tear drop, parallelogram etc. Tilt table technology can also be employed, if needed, for the continuity in printing second curved wall 26 along having second stiffener members 24 as a single piece. This arrangement provides the fabricator an option to continue printing cylindrical shape 16 of wall 18 along with elongated ribs 13 forming parallelogram boundary shapes 14 as a single piece construction.

As the fabricator prints vessel 12 and reaches completion of first end portion 30 of cylindrical shape 16 of wall 18 and completes cylindrical shape 16 of wall 18 that portion of vessel 12, fabricator can continue printing first curved wall 22 with first stiffener members 20 with the application of breakdown tooling. Breakdown tooling will provide support to the printed structure as first curved wall 22 and first stiffener members 20 are printed.

Figure 2:
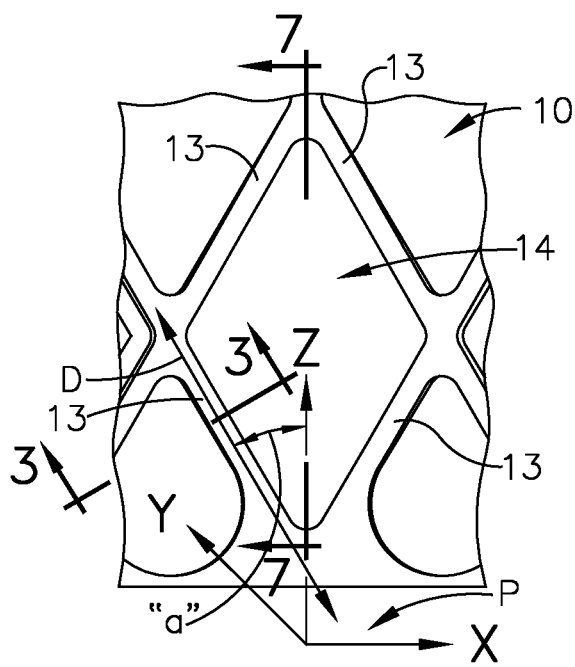
FIG. 2 is an enlarged planar view of a grid stiffened structure which forms a parallelogram boundary shape on a cylindrical portion of the wall of the vessel as seen in FIG. 1.
Figure 3:
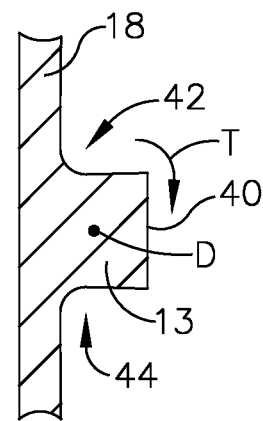
FIG. 3 is a cross section view along line 3-3 of an elongated rib of the grid stiffened structure shown in FIG. 2.
Figure 4:
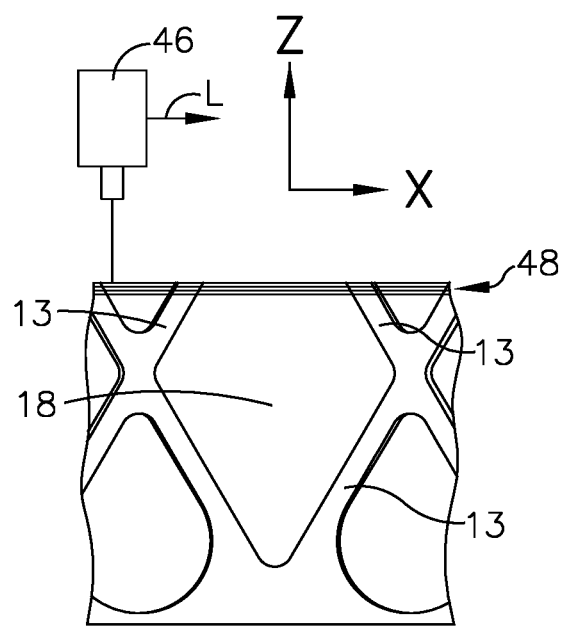
FIG. 4 is a partial schematic view of the grid stiffened structure as shown in FIG. 2 being constructed with 3-D printing.

In referring to FIGS. 2-4 grid stiffened structure 10 is shown with wall 18 and parallelogram boundary shape 14 formed with elongated ribs 13 positioned on and along wall 18 of FIG. 1. Grid stiffened structure 10 has wall 18 which as seen in FIG. 2 extends in a direction transverse, and in this example perpendicular, relative to a plane P, determined with x and y axes. The x and y axes can be positioned perpendicular to one another and could be positioned in one of a variety of positions. In this example x and y axes lie in a horizontal plane. Elongated rib 13 is connected to wall 18 along an elongated dimension D of elongated rib 13 such that elongated rib 13 extends along 18 wall and forms an angle "a" with an axis, in this example, the z axis, which extends in a direction perpendicular to plane D and in this example in a vertical direction. In this example, angle "a" does not exceed fifty three degrees (53°).

As seen in FIG. 3, elongated rib 13 defines free sidewall 40 which extends from wall 18 positioned on first side 42 of elongated rib 13 and extends in a direction T about elongated rib 13 and transverse to the elongated dimension D to wall 18 positioned on second side 44 of elongated rib 13. With employment of 3-D printer 46, wall 18 and elongated rib 13 are constructed of a plurality of layers 48 of material which extend in a direction L transverse or in this example perpendicular to z-axis, as seen in FIG. 4. The plurality of layers 48 of material are detectable on the finished product with the naked eye or with a CT scanner. With grid stiffened structure 10 being constructed with 3-D printer 46, the 3-D printing equipment and materials which are used in constructing the plurality of layers 48 of material provide angular limitations of construction relative to vertical orientation such as axis z. As a result, elongated rib 13 extends along wall 18 in an angular relationship which includes angle "a" with respect to the z axis which can, as mentioned above, include up to fifty-three degrees (53°).

Figure 5:
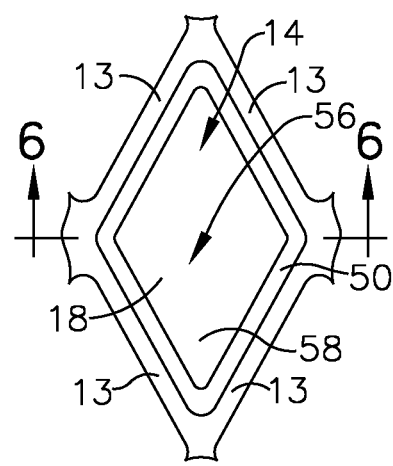
FIG. 5 is a planar view of the grid stiffened structure of FIG. 2 with a fractal wall configuration positioned within the parallelogram boundary shape of the grid stiffened structure.
Figure 6:
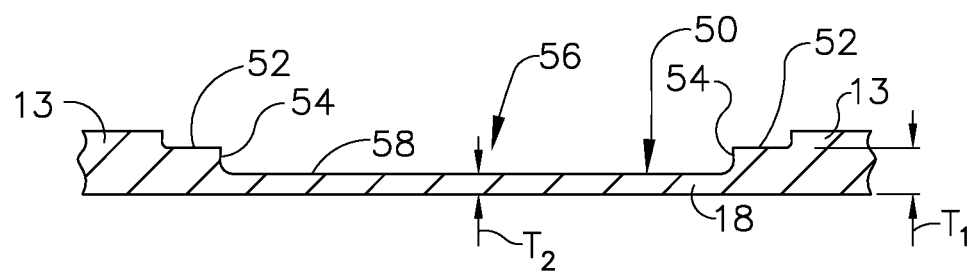
FIG. 6 is a cross section view as taken along line 6-6 of FIG. 5.

The example grid stiffened structure 10 shown in FIGS. 2-4 and described earlier, includes four elongated ribs 13 wherein the four elongated ribs 13 form a parallelogram boundary shape 14. In the interest of providing additional strength to grid stiffened structure 10 additional printed material is provided in the printing process to wall 18 positioned within parallelogram boundary shape 14. In referring to FIGS. 5 and 6, wall 18 positioned within the four elongated ribs 13 includes surface 50 which extends from the four elongated ribs 13. First portion 52 of the surface 50 extends in a direction transverse to the four elongated ribs 13. Second portion 54 of surface 50 extends in a direction transverse to first portion 52 of surface 50. Second portion 54 of surface 50 defines a second parallelogram boundary shape 56 having a lesser dimension than the parallelogram boundary shape 14 formed by the four elongated ribs 13. Third portion 58 of surface 50 extends in a transverse direction from second portion 54 of surface 50. Thickness dimension T1 of wall 18 associated with first portion 52 of surface 50 is greater than thickness dimension T2 of wall 18 associated with third portion 58 of surface 50. This fractal wall arrangement can be selectively constructed in building, for example, cylindrical shape 16 of wall 18 for vessel 12 so as to strategically position additional strength to wall 18 of vessel 12 where needed. Additional to concentrically positioned parallelogram boundary shape 14 and second parallelogram boundary shape 56 one or more additional parallelogram shapes could be constructed positioned concentrically therewith. Other orientations of fractal wall constructions could be employed wherein instead of a concentric arrangement of the boundary shapes positioned within the parallelogram boundary shape 14, smaller parallelogram shape constructions for example can be implemented positioning such boundary shapes in a side by side relationship all within the boundary shape of the four elongated ribs 13.

Figure 7:
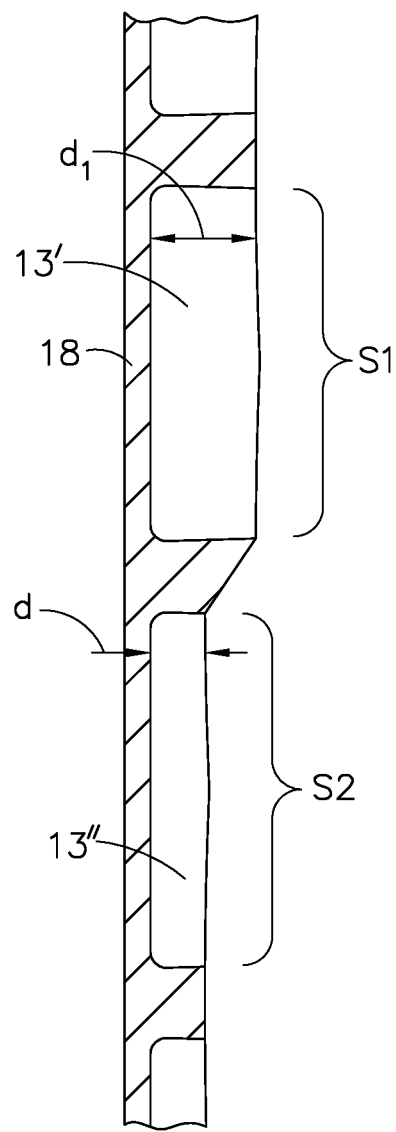
FIG. 7 a cross section view of a first embodiment of the grid stiffened structures as shown in FIG. 2 and which are positioned on the cylindrical portion of the wall of the vessel as seen in FIG. 1.

In referring to FIG. 1 wall 18 forms cylindrical shape 16 and includes a plurality of elongated ribs 13 which, in turn, includes a plurality of sets S of four elongated ribs 13. In this example, each set S forms parallelogram boundary shape 14 within each set S of four elongated ribs 13. In one embodiment, as seen in FIG. 7, a first elongated rib 13' of a first set S1 of the plurality of sets S extends a greater distance d1 away from wall 18 than distance d in which second elongated rib 13" extends away from wall 18 of second set S2 of the plurality of sets S. Providing selective extended distances in which elongated ribs extend away from wall 18 enables elongated ribs to perform as baffles positioned along wall 18 to mitigate fluid contents sloshing within vessel 12 such that for example liquid propellant such as liquid oxygen or liquid hydrogen which may move side to side within wall 18 of cylindrical shape 16 during flight will be resisted with ribs which extend further away from wall 18 and thereby confronting the moving fluid. The extending ribs will reduce the amount of fluid which would tend to move up on one side of vessel 12 and maintain the weight of the fluid fuel more centrally positioned within vessel 12 and thereby reduce shifting of weight of the fluid. Shifting of the weight load within vessel 12 can impart forces on the vehicles and alter undesirable trajectory of the craft during flight. Elongated ribs 13 can be constructed to vary in their distance they extend away from wall 18 as needed to minimize influence on the aircraft's intended direction.

Figure 8:
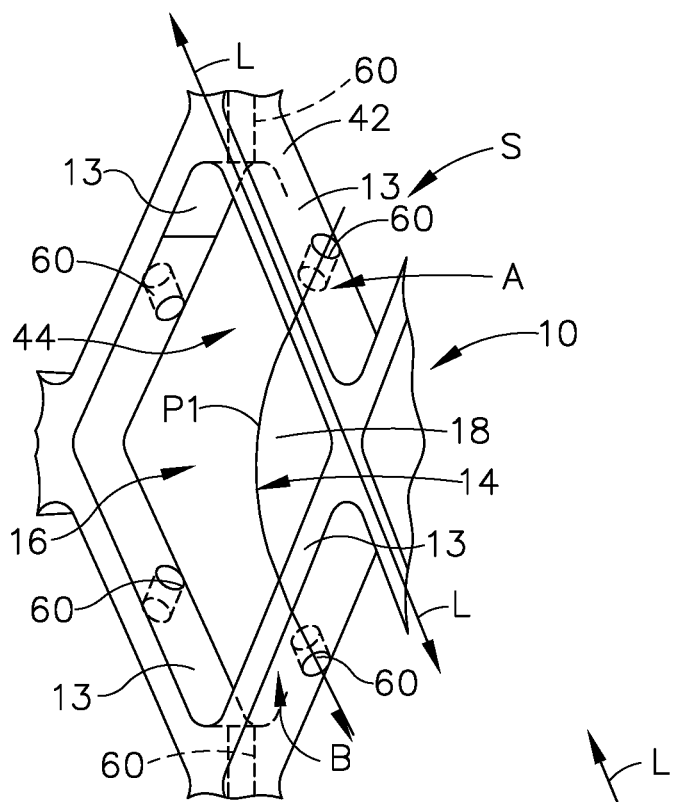
FIG. 8 is a perspective view of a first example of the grid stiffened construction as seen in FIG. 2.

In referring to FIG. 8 a first example of a set S of four elongated ribs 13 of grid stiffened structure 10 is shown. In this example, at least one elongated rib 13 of a set S of four elongated ribs 13 defines bore or drain hole 60 which extends through at least one elongated rib 13 in a direction transverse to a length direction L of at least one elongated rib 13 from first side 42 of elongated rib 13 to second side 44 of elongated rib 13. Drain hole or bore 60 may be positioned in a desired location along elongated rib 13 based on where the analysis deems the location proper. Bore 60 provides, for example, propellant fuel fluid that may be trapped within a set S of four elongated ribs 13 to be able to wick or otherwise drain from first side 42 of elongated rib 13 to second side 44 of elongated rib 13 into an adjacent set S of four elongated ribs 13. Four bores or drain holes 60 are positioned within set S of four elongated ribs 13, one bore 60 within each rib 13 of set S. Bores 60 can also be positioned, as shown in FIG. 8, where two elongated ribs 13 adjoin one another. Bores 60 are positioned through selective elongated ribs 13, as well as at desired locations which are positioned on cylindrical shape 16 of wall 18 of vessel 12, so as to provide a flow path along cylindrical shape 16 of wall 18 for propellant fuel fluid positioned within sets S of four elongated ribs 13 to be able to move toward a fuel exit of vessel 12 which will be discussed in more detail below. Bores 60, as seen in FIG. 8, are positioned, in this embodiment, flush with cylindrical shape 16 of wall 18 so as to facilitate the removal of, for example, fluid content from within set S of four elongated ribs 13.

Figure 9:
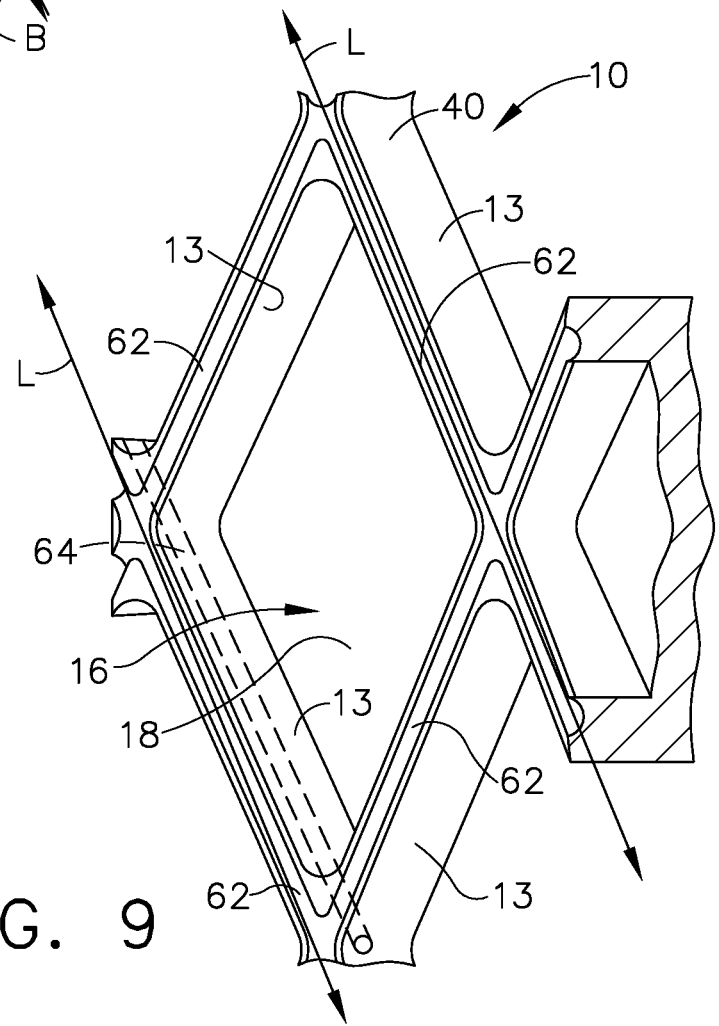
FIG. 9 is the perspective view of a second example of the grid stiffened construction as seen in FIG. 8.

In referring to FIG. 9 a second example of a set S of four elongated ribs 13 of grid stiffened structure 10 is shown. In this example, free sidewall 40 of at least one elongated rib 13 of a set S of four elongated ribs 13 defines a trough 62 which extends in a direction along length L of the at least one elongated rib 13 such that trough 62 provides fluid communication or flow along trough 62 of the at least one elongated rib 13. In selected examples, troughs 62 will be positioned on elongated ribs 13 in adjacent sets S such that a desired flow path is established along a top portion of elongated ribs 13 to permit propellant fuel fluid to flow along troughs 62 from cylindrical shape 16 of wall 18 portion of vessel 12 toward a fuel exit of vessel 12 which will be discussed in more detail below.

In further referring to FIG. 9, grid stiffened structure 10 can also include bore 64 defined by at least one of the elongated ribs 13 of a set S of four elongated ribs 13, wherein bore 64 extends within and along a length L of at least one elongated ribs 13. Bores 64 can be selectively positioned within and along elongated ribs 13 to carry items such as a temperature sensor. Bores 64 can also be used to carry heating or cooling fluids or gasses to facilitate regenerative cooling or heating of the contents of vessel 12. With elongated ribs 13 providing increased surface area and being positioned within vessel 12, increased surface area such as free sidewall 40 can function to provide a convective heat exchanger with the contents of vessel 12. For example, there is a need to rapidly cool the tank for refill of a cryogenic propellant and subsequently there is a need for introduce heat to the contents to keep the fluid at spacecraft conditions. Heat may be introduced with also the use of avionics or other waste heat channeled through bore 64 of vessel 12. With keeping, for example, fluid oxygen or hydrogen at spacecraft conditions, they can be throttled down in pressure to provide a reaction control system, facilitate main tank pressure, used for fuel cell reactants which make water and electricity and to provide breathing oxygen.

Figure 10:
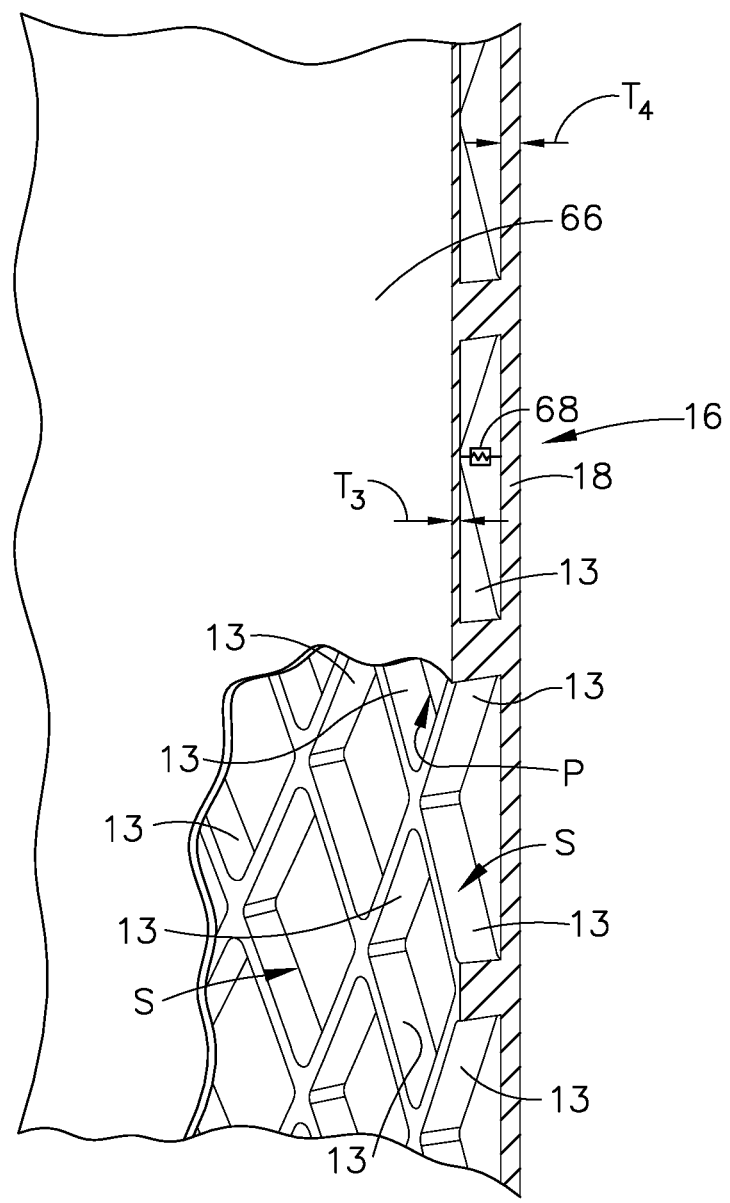
FIG. 10 is a partially broken away view of a second wall positioned so as to sandwich grid stiffeners between an outer wall and the second wall forming a pocket with the outer wall, second wall and the grid stiffeners.

In referring to FIG. 10, grid stiffened structure 10 further includes second wall 66 connected to at least a portion of the plurality of elongated ribs 13 positioning the at least a portion of the plurality of elongated ribs 13 between wall 18 and second wall 66 forming pocket P defined by set S of four elongated ribs 13, wall 18 and second wall 66. Pocket P can be utilized, for example, to carry a pressure transducer resistor device 68 for providing pressure reading information with respect to vessel 12. Pockets P can also be selectively filled with fluid such as water or capacitive fluids.

With filling selective pockets P with water, for example, and with vessel 12 containing a cryogenic temperature fuel, the water will freeze within pocket P and provide additional stiffening and enhance compressive loading and hoop stress pressure resistance. In one example of having wall 18 and second wall 66 arrangement, second wall 66 is of thinner thickness T3 construction than thickness T4 construction of wall 18, as seen in FIG. 10, such that a freezing and expansion of water contained within pocket P will result in exerting a force on second wall 66 in an inward direction of vessel 12 providing additional hoop stress pressure load resistance. Drain holes or bores 60 can be selectively positioned within selective elongated ribs 13 to provide filling of selective pockets P with water. Water contained in pocket P can also provide vibrational dampening of vessel 12, particularly, for example, with vessel 12 operating as a propellant fuel container for an operational rocket.

A capacitive fluid, such as sulfuric acid with water or other fluid such as to create a lithium-ion battery or a nickel metal hydrogen battery within pocket P can create a voltage carrying device. This voltage carrying capability will be helpful for purposes of eliminating the weight of otherwise separate battery housing (and/or structure separating battery system from fuel tank) and/or decreasing the vehicle rotational moment of inertia by centralizing the bus moment of inertia and/or reducing integration and assembly time by combining two bus systems into one and/or increasing the performance of the heat transfer through the sandwiched/honeycombed walls of the tank by increasing the heat transfer coefficient of the honeycomb wall configuration. Similarly, it should be understood selectively positioned drain holes or bores 60 within selective elongated ribs 13 can provide the filling of selective pockets P with the capacitive fluid.

In referring to FIG. 1, first curved wall 22 is secured to first end portion 30 of cylindrical shape 16 of wall 18 and second curved wall 26 is secured to second end portion 36 of cylindrical shape 16 of wall 18 forming vessel 12. As mentioned above, the fabrication of vessel 12 can be done as a singular printed piece or even as two or three separately printed pieces that are subsequently welded together. First curved wall 22 includes first opening 74 through which, in this example, fluid enters vessel 12 or wherein a pressurized inert gas, for example, is introduced to maintain an internal pressure as fluid contents is drained from vessel 12. Second curved wall 26 includes second opening 76 which, in this example, fluid exits vessel 12. Alternatively, second opening 76 can be used to both fill and drain vessel 12.

In referring to FIG. 1, first curved wall 22 includes plurality of first stiffener members 20 connected to and positioned along first curved wall 22. Each of the plurality of first stiffener members 20 includes at least one first wall member 78 configured to extend along first curved wall 22 and forms a boundary shape on the first curved wall 22 which in this example includes three first wall members 78 forming an equilateral triangle boundary shape 23 within three first wall members 78. As mentioned earlier this boundary shape can be one of a number of shapes ortho-grid, iso-grid, parallelogram, tear drop etc.

At least one first wall member 78 includes a first free side surface 80 which extends along at least one first wall member 78, about at least one first wall member 78 from a first side 82 of at least one first wall member 78 to a second opposing side 84 of at least one first wall member 78. Free side surface 80 includes a distal end 86 of at least one first wall member 78 positioned away from first curved wall 22.

Figure 19:
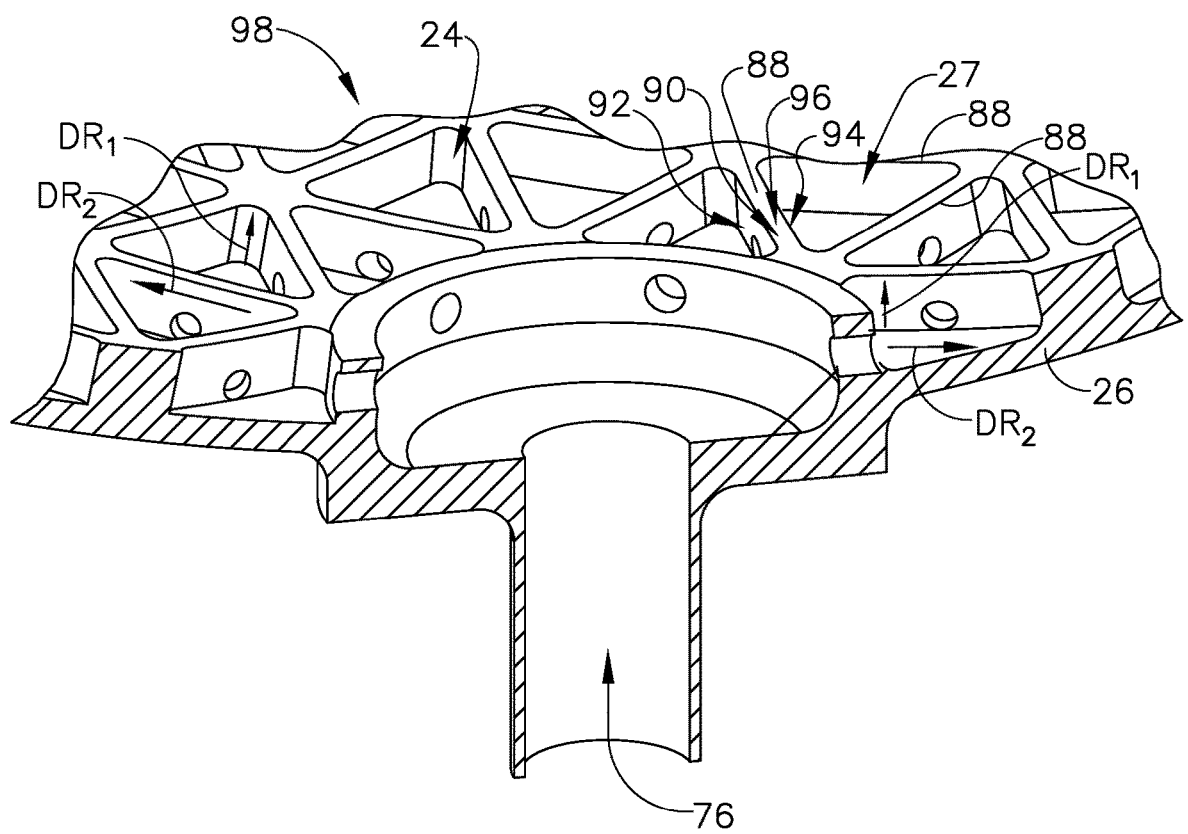
FIG. 19 is a partial perspective cross section view of a portion of the vessel of FIG. 1 which includes a fluid exit from the vessel.

In referring to FIGS. 1 and 19, second curved wall 26 includes plurality of second stiffener members 24 connected to and positioned along second curved wall 26. Each of the plurality of second stiffener members 24 includes at least one second wall member 88 configured to extend along second curved wall 26 and forms a boundary shape on the second curved wall 26 which, in this example, includes three second wall members 88 forming an equilateral triangle boundary shape 27 within three second wall members 88. As mentioned earlier this boundary shape can be one of a number of shapes ortho-grid, iso-grid, parallelogram, tear/rain drop, hexagonal/honeycomb, etc.

At least one second wall member 88 includes a second free side surface 90 which extends along at least one second wall member 88, about at least one second wall member 88 from a first side 92 of at least one second wall member 88 to a second opposing side 94 of at least one second wall member 88. Free side surface 90 includes a distal end 96 of at least one second wall member 88 positioned away from second curved wall 26.

Portion 98 of plurality of second stiffener members 24 are positioned around second opening or exit 76 such that portion 98 of the at least one second wall member 88 of the plurality of second stiffener members 24 extends in a direction away DR1 from second curved wall 26 and extends in a direction along DR2 second curved wall 26 in a direction non-tangential to second opening 76. In some examples, second wall members 88 can extend a further distance from second curved wall 26 in direction DR1 as second wall members 88 become more proximate to second opening or exit 76. Increasing the distance second wall members 88 extend in the DR1 direction provides a mitigation of formation of a vortex of fluid contents exiting second opening 76. The mitigation of formation of a vortex will minimize the amount of gas to exit second opening or exit 76 that would otherwise be permitted to exit with a formation of a vortex with the fluid exiting vessel 12.

In referring to FIG. 1, plurality of sets S of four elongated ribs 13, wherein each set S defines parallelogram boundary shape 14 positioned within the four elongated ribs 13 positioned along wall 18. Additionally, a plurality of first transition stiffener members 28 are positioned along a first end portion 30 of the wall. Each of first transition stiffener members 28 includes first wall member 100 which forms tear drop shape boundary 32 within first wall member 100 on first end portion 30 of wall 18. In referring to FIG. 1, a plurality of the second transition stiffener members 34 are positioned along a second end portion 36 of wall 18. Each of the second transition stiffener members 34 includes second wall member 102 which forms tear drop shape boundary 38 within second wall member 102 on second end portion 36 of wall 18.

As was discussed earlier, parallelogram boundary shape 14 of grid stiffened structure 10 can selectively have a fractal wall arrangement wherein a portion of wall 18 positioned between four elongated ribs 13 has a thicker construction of wall 18 for that portion than the remainder of wall 18 positioned between the four elongated ribs 13. Additionally, the thicker construction of that portion of wall 18 forms a boundary shape of a parallelogram shape configuration with a smaller dimension than the parallelogram boundary shape 14 formed by four elongated ribs 13. Also these smaller dimensioned similarly shaped boundary shapes can be positioned concentrically or spaced apart from one another within parallelogram boundary shape 14. Similarly, this fractal wall arrangement can be applied as needed by the fabricator for first and second stiffener members 20 and 24 positioned on first and second curved walls 22, 26, respectively, and as needed with respect to first and second transition stiffener members 28, 34 positioned on first and second end portions 30, 36, respectively. This will be discussed herein and examples shown in FIGS. 11-14.

Fabricator of vessel 12 can elect to have a fractal wall arrangement for vessel 12 constructed for at least one of first stiffener member 20, second stiffener member 24, first transition stiffener member 28 and second transition stiffener member 34. The fabricator will strategically position the fractal wall arrangement(s) where the requisite additional strength is needed for vessel 12. The configuration of a fractal wall arrangement for first stiffener member 20 with first curved wall 22, as seen in FIGS. 11 and 12, will be the same, for this example, as for second stiffener member 24 with second curved wall 26 shown in FIG. 1.

Figure 11:
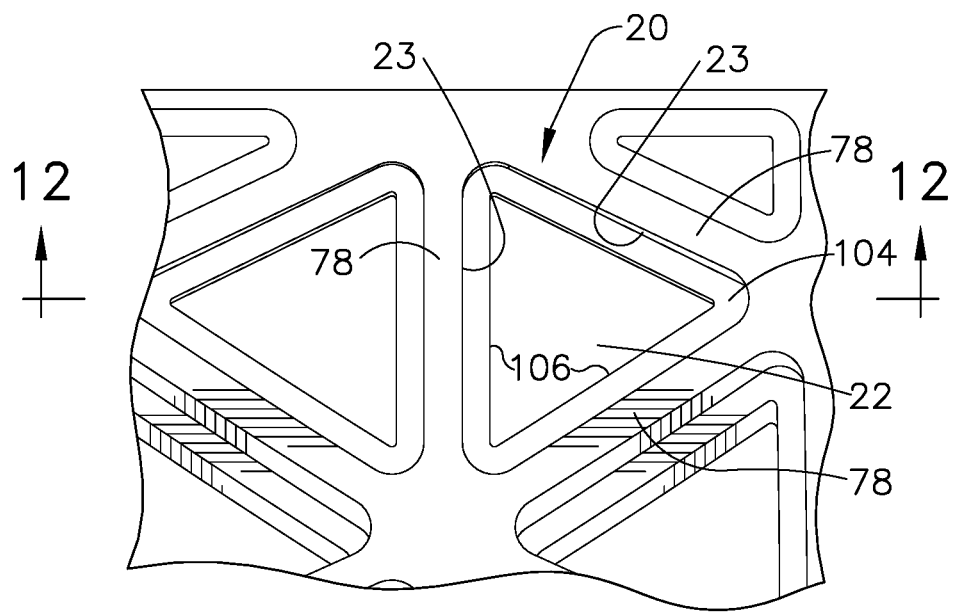
FIG. 11 is a perspective view of the grid stiffened construction positioned on a curved portion of the vessel as seen in FIG. 1 with a fractal wall configuration positioned within the boundary shape of the grid stiffened structure.
Figure 12:
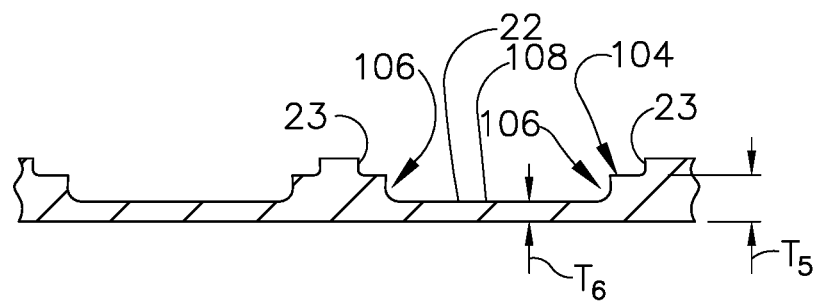
FIG. 12 is a cross section view as seen along line 12-12 of FIG. 11.

In referring to FIG. 11, first stiffener member 20, in this example, includes having first curved wall 22 positioned within the boundary shape, in this example, three first wall members 78 form an equilateral triangle boundary shape 23. A first part 104 of first curved wall 22, as seen in FIG. 12, has a thicker dimension T5 of first curved wall 22 than thickness dimension T6 of second part 108 of first curved wall 22. First part 104 of first curved wall 22 defines a boundary shape 106 positioned between first part 104 and second part 108 of first curved wall 22. Boundary shape 106 is also an equilateral triangle boundary shape with boundary shape 106 having a smaller dimension than equilateral triangle boundary shape 23.

Second stiffener member 24 positioned on second curved wall 26, shown in FIG. 1, has, in this example as mentioned above, the same construction as the fractal wall arrangement of first stiffener member 20 described above and shown in FIGS. 11 and 12. Second curved wall 26, as seen in FIG. 1, is positioned within the boundary shape, in this example, having equilateral triangle boundary shape 27, as seen in FIG. 1 and as is shown for first stiffener member 20 as equilateral triangle boundary shape 23 in FIG. 11. A first part, of second curved wall 26 (shown as first curved wall 22 with first part 104 in FIG. 12) has a boundary shape positioned between first part and second part of second curved wall 26 (shown as a boundary shape 106 positioned between first part 104 and second part 108 of first curved wall 22 in FIG. 12). First part of second curved wall 26 (shown as first part 104 of first curved wall 22) defines a boundary shape positioned between first part and second part of second curved wall 26 (shown as boundary shape 106 positioned between first part 104 and second part 108 of first curved wall 22). Boundary shape is also an equilateral triangle boundary shape with boundary shape (shown as boundary shape 106 which is also an equilateral triangle boundary shape 106 in FIG. 12) having a smaller dimension than equilateral triangle boundary shape 27, referred to in FIG. 1.

Figure 13:
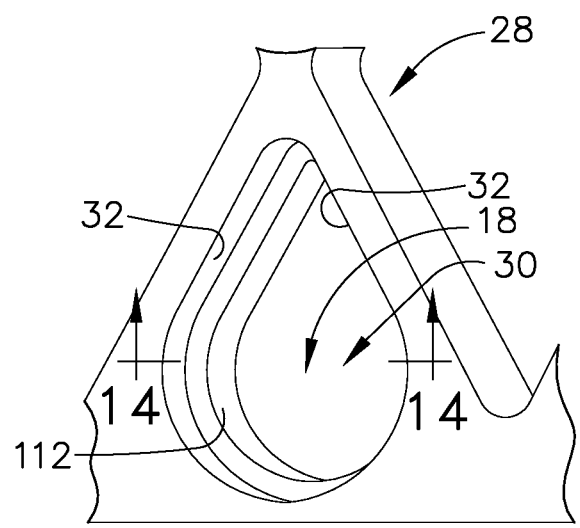
FIG. 13 is a perspective view of the grid stiffened construction positioned along opposing end portions of the cylindrical portion of the vessel as seen in FIG. 1 with a fractal wall configuration positioned within the tear drop boundary shape of the grid stiffened structure.
Figure 14:
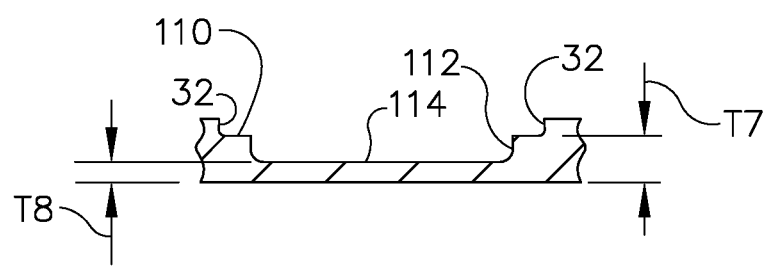
FIG. 14 is a cross section view as seen along line 14-14 of FIG. 13.

In referring to FIGS. 13 and 14, first transition stiffener member 28, in this example, has first end portion 30 of the wall 18 within tear drop shape boundary 32 such that first part 110, as shown in FIG. 14, of first end portion 30 of the wall 18 has a thicker dimension T7 than second part 114 of the first end portion 30 of the wall 18 and first part 110 of first end portion 30 of wall 18 defines tear drop shape 112 of smaller dimension than tear drop shape boundary 32.

Second transition stiffener member 34 has second end portion 36 of wall 18 within tear drop shape boundary 38, as shown in FIG. 1, has, in this example, the same construction as the fractal wall arrangement of first transition stiffener member 28 described above and shown in FIGS. 13 and 14. Second end portion 36, as seen in FIG. 1, is positioned within the boundary shape, in this example, boundary shape is that of tear drop shape boundary 38, as seen in FIG. 1. First part of second end portion 36 of wall 18 (not shown but having the configuration of first part 110 of first end portion 30 of wall 18 as shown in FIG. 14) has a thicker dimension for first part (not shown but having the configuration of thicker dimension T7 for first part 110 as seen in FIG. 14) than thickness dimension of second part of second end portion 36 of wall 18 (not shown but having the configuration of thickness dimension T8 of second part 114 of first end portion 30 of wall 18 shown in FIG. 14). First part, not shown, of second end portion 36 of wall 18 for second transition stiffener member 34 defines a tear drop shape such as that shown for tear drop shape 112 of FIG. 14 of smaller dimension than tear drop shape boundary 38, as referred to in FIG. 1, of second transition stiffener member 34.

Fabricator of vessel 12 can elect to have at least one of first stiffener members 20, second stiffener members 24, first transition stiffener members 28 and second transition stiffener members 34 to include at least one of a drain hole and trough. Fluid within vessel 12 can be wicked through drain holes or bores of members of grid stiffened structure 10 to avoid unnecessarily trapping fluid within grid stiffened structure 10 and thereby maximizing fluid content of vessel 12 reaching second opening or exit 76. Fluid can also be transported along troughs, as will be described in more detail herein, to also maximize fluid content of vessel 12 reaching second opening or exit 76. The drain holes or bores, as can the troughs, be employed and strategically located so as to provide a fluid path through grid stiffened structure 10 which can direct fluid flow to second opening 76. Second opening 76 may, at that location, also selectively include a propellant management device (PMD) or a vortex generator.

Figure 15:
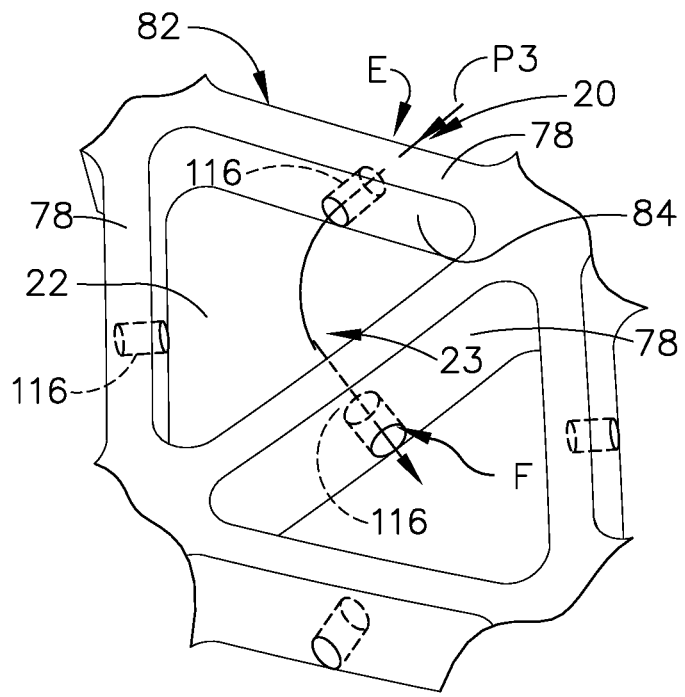
FIG. 15 is a perspective view of a first example of the grid stiffened construction positioned along the curved wall of FIG. 1.
Figure 16:
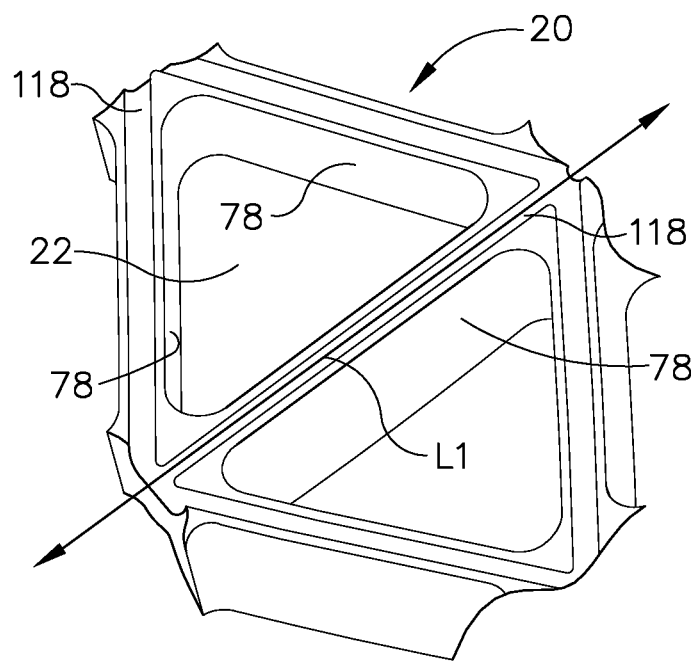
FIG. 16 is a perspective view of a second example of the grid stiffened construction positioned along the curved wall of FIG. 15.

In referring to FIGS. 15 and 16, first stiffener member 20, for example, includes at least one first wall member 78. At least one first wall member 78 defines at least one of: a drain hole or bore 116 which extends from first side 82 of the at least one first wall member 78 to second opposing side 84 of at least one first wall member 78 providing fluid communication from first side 82 of at least one first wall member 78 through bore 116 to second opposing side 84 of at least one first wall member 78; and a trough 118, which extends along a length L1 of the at least one first wall member 78, as seen in FIG. 16, providing fluid communication along at least one first wall member 78. Bores 116, as seen in FIG. 15, are positioned, in this embodiment, flush with second curved wall 22 so as to facilitate the removal of, for example, fluid content positioned within at least one first wall member 78.

The fabricator of vessel 12 can elect to construct second stiffener member 24 as discussed above and shown for first stiffener member 20 in FIGS. 15 and 16. Second stiffener member 24 includes at least one second wall member 88, as seen in FIG. 1, which defines at least one of: a bore or drain hole (not shown but having the structure as shown for bore or drain hole 116 for first stiffener member 20 in FIG. 16) which extends from first side 92, as shown in FIG. 1, of at least one second wall member 88 to second opposing side 94 of at least one second wall member 88 providing fluid communication from first side 92 of the at least one second wall member 88 to second opposing side 94 of the at least one second wall member 88; and a trough (not shown but being similar to the structure shown for trough 118 of first stiffener member 20 of FIG. 16) which extends along a length of the at least second wall member 88 providing fluid communication along the at least one second wall member 88. The fabricator can elect to increase the size dimension of the drain hole of second stiffener members 24 as second stiffener members 24 become more proximate in position second opening or exit 76. The increased dimension can permit additional flow capacity and facilitates the fluid content of vessel 12 to reach second opening 76 in a desired flow and in a less disruptive manner. Additionally, drain holes or bores associated with second stiffener member 24 can be altered in configuration as the 3-D printer constructs second stiffener members 24 that are positioned in a more vertical orientation. As second stiffener member 24 attains a more vertical orientation in the printing operation the construction of the drain hole is constructed to be narrower in configuration as the drain hole extends in a direction away from second curved wall 22. This configuration for the drain hole or bore can include, for example, a diamond shape or tear drop shape or the like which optimizes the printing process so as not to require support during the process.

Figure 17:
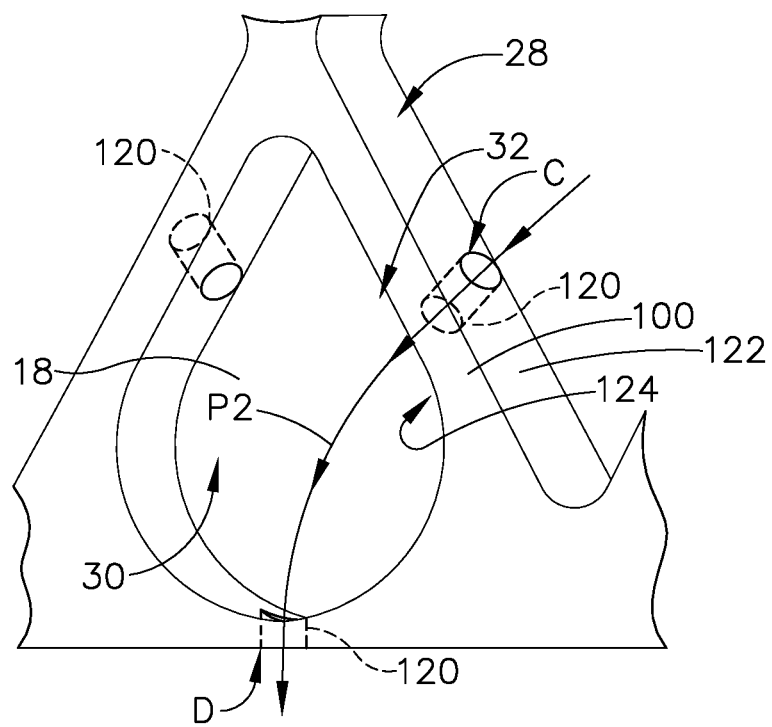
FIG. 17 is a perspective view of a first example of the grid stiffened construction position along opposing end portions of the cylindrical portion of the vessel as seen in FIG. 1.
Figure 18:
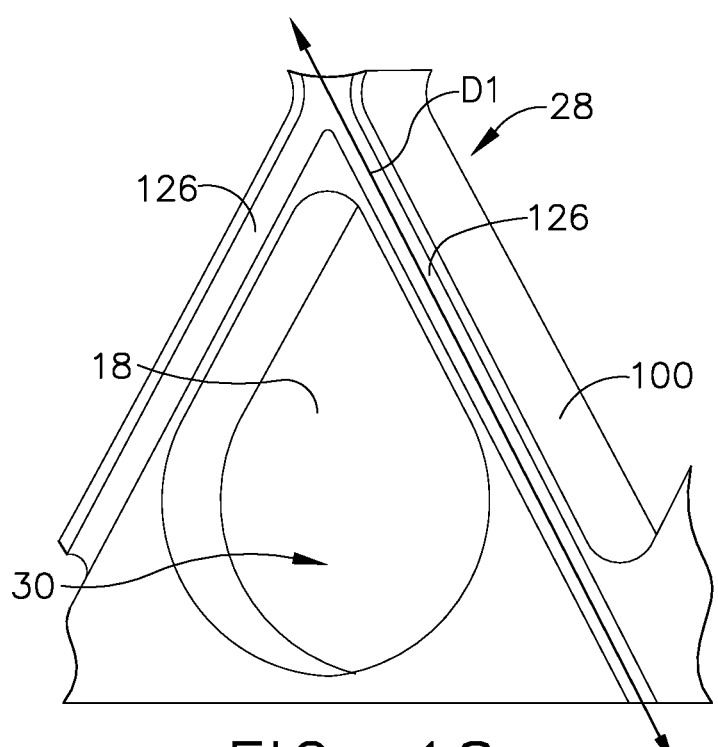
FIG. 18 is a perspective view of a second example of the grid stiffened construction of FIG. 17.

In referring to FIGS. 17 and 18, first transition stiffener member 28 of the plurality of first transition stiffener members 28 of this example includes first wall member 100 which defines at least one of: bore 120 which extends through first wall member 100 and provides fluid communication from first side 122 of first wall member 100 to second opposing side 124 of first wall member 100; and trough 126, as seen in FIG. 18, which extends in a direction D1 along first wall member 100 providing fluid communication along first wall member 100. Bores 120, as seen in FIG. 17, are positioned, in this embodiment, flush with wall 18 so as to facilitate the removal of, for example, fluid content positioned within first transition stiffener member 28.

The fabricator can elect to construct second transition stiffener member 34 as described and shown for first transition stiffener member 28 in FIGS. 15 and 16. Second transition stiffener member 34 of plurality of second transition stiffener members 34 of this example includes second wall member 102, as shown in FIG. 1, which defines one of: bore or drain hole (not shown but is similar in construction as shown for bore 120 in FIG. 17) which extends through second wall member 102 and provides fluid communication from first side of second wall member 102 to a second opposing side of second wall member 102 (also not shown but similar in orientation as first side 122 and second opposing side 124 for first transition stiffener member 28 as shown in FIG. 17); and trough (not shown but with similar construction as trough 126 for first transition stiffener member 28 as shown in FIG. 18) which extends in a direction along second wall member 102 providing fluid communication along second wall member 102.

In referring to FIG. 1, vessel 12 with grid stiffened structure 10 includes, as described earlier, wall 18 which defines cylindrical shape 16. First curved wall 22 is connected to the first end portion 30 of wall 18 and second curved wall 26 is connected to second end portion 36 of wall 18. Wall 18, first curved wall 22 and second curved wall 26 are constructed with additive manufacturing utilizing 3-D printing as discussed earlier. First curved wall 22 defines first opening 74 for fluid to enter vessel 12 and second curved wall 26 defines second opening 76 for fluid to exit vessel 12. As described earlier, first opening 74 can also be used for introducing a pressurized gas to maintain an internal pressure as fluid contents are drained from vessel 12. Also, second opening 76 can be used to both fill and drain vessel 12. Plurality of elongated ribs 13, each elongated rib 13 is connected to wall 18 along the length dimension D of each of the plurality of elongated ribs 13 through the laying down of layers of material with the 3-D printing fabrication process. Plurality of elongated ribs 13 include a plurality of sets S of four elongated ribs 13, as seen in FIG. 1. Each set S forms within the four elongated ribs 13 a parallelogram boundary shape 14 along wall 18. Wall 18 and plurality of elongated ribs 13 are constructed of a plurality of layers 48 of material, as shown in FIG. 4, which extend in a direction transverse to a length direction, as shown in FIG. 4 wherein the length direction for wall 18, in this example, extends in the z-axis direction.

In referring to FIG. 1, plurality of first transition stiffener members 28 each includes first wall member 100 which is connected to and positioned to extend along a first end portion 30 of wall 18 wherein each first transition stiffener member 28 forms a tear drop shape boundary 32 within first wall member 100 along first end portion 30 of wall 18. Plurality of second transition stiffener members 34 each includes second wall member 102 which is connected to and positioned to extend along second end portion 36 of wall 18, wherein each second transition stiffener member 34 forms tear drop shape boundary 38 within second wall member 102 along second end portion 36 of wall 18.

Plurality of first stiffener members 20 are connected to and positioned to extend along first curved wall 22 wherein at least one of plurality of first stiffener members 20 includes at least one first wall member 78 connected to first curved wall 22 which forms boundary shape, in this example, an equilateral triangle boundary shape 23 with first curved wall 22. Plurality of second stiffener members 24 are connected to and positioned to extend along second curved wall 26 and around second opening 76, wherein at least one of the plurality of second stiffener members 24 includes at least one second wall member 88 connected to second curved wall 26 which forms a boundary shape, in this example, an equilateral triangle shape similar to equilateral triangle boundary shape 23 of first stiffener member 20, with second curved wall 26.

In referring to FIG. 7, at least one first elongated rib 13', of a first set S1 of four elongated ribs, extends in a direction further away, distance dl from wall 18 than a second elongated rib 13" of a second set S2 of four elongated ribs extends distance d from wall 18. In referring to FIG. 19 at least one second wall member 88 of plurality of second stiffener members 24 extends in a direction DR1 away from second curved wall 26 and in direction DR2 along second curved wall 26 non-tangential to second opening 76. As discussed earlier, an increase in second wall member 88 extending in a direction DR1 provides resistance to and mitigation of formation of a vortex from fluid exiting vessel 12 through second opening 76.

Vessel 12 with grid stiffened structure 10 includes providing a flow path for fluid content of vessel 12 to optimize the fluid reaching second opening or exit 76 of vessel 12. In fabricating vessel 12 the fabricator can select constructing a flow path through at least one of: set of four elongated ribs 1, first transition stiffener members 28, second transition stiffener members 34, first stiffener members 20 and second stiffener member 24.

The fabricator can elect to include a flow path through at least one of the following grid stiffened structures 10 of: a set S of four elongated ribs 13 which form a parallelogram boundary shape 14, first transition stiffener members 28; second transition stiffener members 34, first stiffener members 20 and second stiffener members 24. The flow path is determined by the positioning of drain holes or bores through each of these grid stiffened structures 10 such that fluid content within vessel 12 can wick or flow through grid stiffened structures 10 and not be trapped within grid stiffened structures 10. The flow path will be utilized to maximize the amount of fluid content that can reach second opening 76 of vessel 12.

In referring to FIG. 8, set S of four elongated ribs 13 form the parallelogram boundary shape 14 wherein at least two of the four elongated ribs 13, in this example, all four ribs 13, each define at least one bore 60. In this example, a first location A and a second location B extending through the at least two of the four elongated ribs 13 provide a flow path P1 from outside set S of the four elongated ribs 13 at the first location A, into within the parallelogram boundary shape 14 and out of the parallelogram boundary shape 14 at the second location B to outside of set S of the four elongated ribs 13.

In referring to FIG. 17, first wall member 100 of the plurality of first transition stiffener members 28 defines bore or drain hole 120 positioned in a first location C and in a second location D extending through first wall member 100 providing a flow path P2 from outside first wall member 100 at first location C into within tear drop shape boundary 32 and out of tear drop shape boundary 32 through first wall member 100 at the second location D.

In referring to FIGS. 1 and 17, second wall member 102 of the plurality of second transition stiffener members 34 defines a bore positioned in a first location and a second location extending through the second wall member (not shown but is similar in construction to that shown in FIG. 17 with respect to bore 120 positioned in first location C and second location D for first transition stiffener member 28). This provides a flow path from outside the second wall member at the first location into within the tear drop shape boundary and out of the tear shape boundary through the second wall member at the second location (which is also not shown but has the construction as shown in FIG. 17 for first transition stiffener member 28 wherein flow path P2 from outside first wall member 100 at first location C into within the tear drop shape boundary 32 and out of the tear drop shape boundary 32 through the first wall member 100 at second location D.)

In referring to FIG. 15, at least one first wall member 78 of the plurality of first stiffener members 20 defines a bore 116 positioned in a first location E and in a second location F extending through the at least one first wall member 78. This provides a flow path P3 from outside of first stiffener member 20 into, at the first location E, and within the boundary shape 23, which is in this example an equilateral triangle shape. Flow path P3 continues out of the equilateral triangle boundary shape 23 through the at least one first wall member 78 at the second location F.

In referring to FIGS. 1 and 15, at least one second wall member 88 of the plurality of second stiffener members 24 defines a bore or drain hole positioned in a first location and a second location extending through the at least one second wall member (this is not shown but has the similar construction of first stiffener member 20 as described above and shown in FIG. 15 wherein bore 116 is positioned in first location E and second location F extending through the at least one first wall member 78). This provides a flow path from outside of the second stiffener member 24 into, at the first location, and within the boundary shape and out of the boundary shape through the at least one second wall member at the second location (this is also not shown but has a similar construction as shown for first stiffener member 20 in FIG. 15 wherein flow path P3 from outside of the first stiffener member 20 into, at the first location E, and within the equilateral triangle boundary shape 23, which is equilateral triangle boundary shape 27 for second stiffener member 24 shown in FIG. 1, and out of the equilateral triangle boundary shape 23 through the at least one first wall member 78 at the second location F).

As discusses earlier, the fabricator can elect to include troughs within grid stiffened structure 10 so as to facilitate fluid content flow within vessel 12 reaching second opening or exit 76. Thus, at least one of elongated rib 13, first stiffener member 20, second stiffener member 24, first transition stiffener member 28 and second transition stiffener member 34 can be selected to facilitate fluid content flow. Elongated rib 13, for example, of the plurality of elongated ribs 13 defines, as shown in FIG. 9, trough 62 which extends in a direction along a length L of elongated rib 13. In the example of first stiffener member 20, as seen in FIG. 16, of the plurality of first stiffener members 20, defines trough 118 which extends along in a direction along a length L1 of first stiffener member 20. Second stiffener member 24 of the plurality of second stiffener members 24 defines a trough which extends along a length of second stiffener member 24 (not shown but has the similar structure as set forth for first stiffener member 20 as shown in FIG. 16). First transition stiffener member 28 of the plurality of first transition stiffener members 28 defines trough 126, as shown in FIG. 18, which extends along in a direction D1 of first transition stiffener member 28. Second transition stiffener member 34 of the plurality of second transition stiffener members 34 defines a trough which extends along the second transition stiffener member 34 (not shown but has the similar construction of that shown for first transition stiffener member 28 in FIG. 18).

As previously discussed, the fabricator can elect to construct vessel 12 with a second wall 66, as shown in FIG. 10, connected to at least a portion of the plurality of elongated ribs 13 positioning the at least a portion of the plurality of elongated ribs 13 between wall 18 and second wall 66 forming pocket P. Pocket P is defined by set S of the plurality of sets of four elongated ribs 13, wall 18 and second wall 66. Pockets P as discussed earlier provide the opportunity to install within pocket P a pressure transducer resistor device 68, capacitive fluid or water positioned within pocket P. These varied applications provide beneficial features to vessel 12 as previously discussed.

The fabricator of vessel 12 may include thermal deformation compensation. Modeling vessel 12 in meshing software, the design may be tailored prior to deposition such that thermal deformation during build and cooling permits the tank to settle into the intended shape. The meshing may incorporate added nodes at critical locations (e.g., the junction between the stiffener members or JGR rib and the skin). Prior to print, the Finite Element Model ("FEM") may be verified with Doublet Lattice Method ("DLM") for aeroelasticity determination of the vibrational influence on vessel 12. A variety of discretization strategies may be employed for converting the Standard for the exchange of Product/Stereo Lithography ("STP/STL") file to the FEM. Extra nodes may be applied to any welding locations and/or the transition from the cylindrical shape 16 to the dome. The mesh will then follow the arc of the dome towards the entry and exit spigots. With greater resolution, there will be greater fidelity between the shaping of the dome and the mesh arcs.

With the completion of printing of vessel 12, the fabricator can finish the production with electing to annealing the material so as to further enhance the strength of vessel 12. In another example, the fabricator can remove unwanted burrs with utilization of ceramic material being rotated within vessel 12.

While various embodiments have been described above, this disclosure is not intended to be limited thereto. Variations can be made to the disclosed embodiments that are still within the scope of the appended claims.

What is claimed is:

1. A grid stiffened structure, comprising:
   a wall which extends in a direction transverse relative to a plane and along an axis which extends in a direction perpendicular to the plane; and
   an elongated rib connected along an elongated dimension of the rib to the wall such that the elongated rib extends along the wall and forms an angle with the axis which extends in a direction perpendicular to the plane, wherein:
      the elongated rib defines a free sidewall which extends from the wall positioned on a first side of the elongated rib and extends in a direction about the elongated rib and transverse to the elongated dimension to the wall positioned on a second side of the elongated rib; and
      the wall and the elongated rib are constructed of a plurality of layers of material which extend in a direction transverse to the axis.

2. The grid stiffened structure of claim 1, wherein the angle with the axis includes up to fifty-three degrees.

3. The grid stiffened structure of claim 1, wherein the axis is a vertical direction.

4. The grid stiffened structure of claim 2, further comprises four elongated ribs forming a parallelogram boundary shape within the four elongated ribs.

5. The grid stiffened structure of claim 4, wherein the wall positioned within the four elongated ribs comprises a surface which extends from the four elongated ribs, wherein:
   a first portion of the surface extends in a direction transverse to the four elongated ribs;
   a second portion of the surface extends in a direction transverse to the first portion of the surface, wherein the second portion of the surface defines a second parallelogram boundary shape having a lesser dimension than the parallelogram boundary shape; and
   a third portion of the surface which extends in a transverse direction from the second portion of the surface, wherein a thickness dimension of the wall associated with the first portion of the surface is greater than a thickness dimension of the wall associated with the third portion of the surface.

6. The grid stiffened structure of claim 4, wherein the wall forms a cylindrical shape.

7. The grid stiffened structure of claim 6 further comprises a plurality of elongated ribs which include a plurality of sets of four elongated ribs wherein each set forms the parallelogram boundary shape within each set of four elongated ribs.

8. The grid stiffened structure of claim 7 wherein a first elongated rib of a first set of the plurality of sets extends a greater distance away from the wall than a distance in which a second elongated rib of a second set of the plurality of sets extends away from the wall.

9. The grid stiffened structure of claim 7 wherein at least one elongated rib of a set of four elongated ribs defines a bore which extends through the at least one elongated rib in a direction transverse to a length direction of the at least one elongated rib, providing fluid communication from the first side of the at least one elongated rib through the at least one elongated rib to the second side of the at least one elongated rib.

10. The grid stiffened structure of claim 7 wherein the free sidewall of at least one elongated rib of a set of four elongated ribs defines a trough which extends in a direction along a length of the at least one elongated rib such that the trough provides fluid communication along the trough of the at least one elongated rib.

11. The grid stiffened structure of claim 7 further comprises a bore defined by at least one of the elongated ribs of a set of four elongated ribs, wherein the bore extends within and along a length of the at least one of the elongated ribs.

12. The grid stiffened structure of claim 7 further comprises a second wall connected to at least a portion of the plurality of elongated ribs positioning the at least a portion of the plurality of elongated ribs between the wall and the second wall forming a pocket defined by a set of four elongated ribs, the wall and the second wall.

13. The grid stiffened structure of claim 12 further comprises one of a pressure transducer resistor, capacitive fluid and water positioned within the pocket.

14. The grid stiffened structure of claim 12 wherein the second wall has a thickness thinner than a thickness of the wall.

15. The grid stiffened structure of claim 6 further comprises:
   a first curved wall secured to a first end of the wall;
   a second curved wall secured to a second end of the wall wherein:
      the first curved wall, second curved wall and the wall form a vessel;
      the first curved wall defines a first opening through which fluid enters the vessel and the second curved wall defines a second opening through which fluid exits the vessel; and the first curved wall includes a plurality of first stiffener members connected to and positioned along the first curved wall wherein:
  each of the plurality of first stiffener members comprises at least one first wall member configured to extend along the first curved wall and forms a boundary shape on the first curved wall; and
  the at least one first wall member comprises a first free side surface which extends along the at least one first wall member, about the at least one first wall member from a first side of the at least one first wall member to a second opposing side of the at least one first wall member and which includes a distal end of the at least one first wall member positioned away from the first curved wall;
the second curved wall includes a plurality of second stiffener members connected to and positioned along the second curved wall wherein:
  each of the plurality of second stiffener members comprises at least one second wall member configured to extend along the second curved wall and forms a boundary shape on the second curved wall;
  the at least one second wall member comprises a second free side surface which extends along the at least one second wall member, about the at least one second wall member from a first side of the at least one second wall member to a second opposing side of the at least one second wall member and which includes a distal end of the at least one second wall member positioned away from the second curved wall; and
  a portion of the plurality of second stiffener members are positioned around the second opening such that a portion of the at least one second wall member of the plurality of second stiffener members extends in a direction away from the second curved wall and extends in a direction along the second curved wall in a direction non-tangential to the second opening;
a plurality of sets of the four elongated ribs wherein each set defines the parallelogram boundary shape positioned within the four elongated ribs positioned along the wall;
a plurality of first transition stiffener members connected to and positioned along a first end portion of the wall, wherein each of the first transition stiffener members comprises a first wall member which forms a tear drop shape boundary within the first wall member on the first end portion of the wall; and
a plurality of second transition stiffener members connected to and positioned along a second end portion of the wall, wherein each of the second transition stiffener members comprises a second wall member which forms a tear drop shape boundary within the second wall member on the second end portion of the wall.

16. The grid stiffened structure of claim 15, comprises at least one of:
  a first stiffener member having the first curved wall positioned within the boundary shape such that a first part of the first curved wall has a thicker dimension than a second part of the first curved wall and the first part of the first curved wall defines a shape of the boundary shape with a smaller dimension;
  a second stiffener member having the second curved wall positioned within the boundary shape such that a first part of the second curved wall has a thicker dimension than a second part of the second curved wall and the first part of the second curved wall defines a shape of the boundary shape with a smaller dimension;
  a first transition stiffener member having the first end portion of the wall within the tear drop shape boundary such that a first part of the first end portion of the wall has a thicker dimension than a second part of the first end portion of the wall and the first part of the first end portion of the wall defines a tear drop shape of smaller dimension than the tear drop shape boundary; and
  a second transition stiffener member having the second end portion of the wall within the tear drop shape boundary such that a first part of the second end portion of the wall has a thicker dimension than a second part of the second end portion of the wall and the first part of the second end portion of the wall defines a tear drop shape of smaller dimension than the tear drop shape boundary.

17. The grid stiffened structure of claim 15, comprises at least one of:
  a first stiffener member which includes the at least one first wall member which defines at least one: of a bore which extends from a first side of the at least one first wall member to a second opposing side of the at least one first wall member providing fluid communication from the first side of the at least one first wall member to the second opposing side of the at least one first wall member and a trough which extends along a length of the at least one first wall member providing fluid communication along the at least one first wall member;
  a second stiffener member which includes at least one second wall member which defines: at least one of a bore which extends from a first side of the at least one second wall member to a second opposing side of the at least one second wall member providing fluid communication from the first side of the at least one second wall member to the second opposing side of the at least one second wall member and a trough which extends along a length of the at least one second wall member providing fluid communication along the at least one second wall member;
  a first transition stiffener member of the plurality of first transition stiffener members comprises a first wall member which defines: at least one of a bore which extends through the first wall member and provides fluid communication from a first side of the first wall member to a second opposing side of the first wall member and a trough which extends in a direction along the first wall member providing fluid communication along the first wall member; and
  a second transition stiffener member of the plurality of second transition stiffener members comprises a second wall member which defines: at least one of a bore which extends through the second wall member and provides fluid communication from a first side of the second wall member to a second opposing side of the second wall member and a trough which extends in a direction along the second wall member providing fluid communication along the second wall member.

18. A vessel with grid stiffened structure, comprises:
a wall defining a cylindrical shape;
a first curved wall connected to a first end portion of the wall;
a second curved wall connected to a second end portion of the wall, wherein:

the first curved wall defines a first opening for fluid to enter the vessel; and the second curved wall defines a second opening for fluid to exit the vessel;

a plurality of elongated ribs wherein each elongated rib is connected to the wall along a length dimension of each of the plurality of elongated ribs, wherein:

the plurality of elongated ribs comprise a plurality of sets of four elongated ribs;

each set forms within the four elongated ribs a parallelogram boundary shape along the wall; and the wall and the plurality of elongated ribs are constructed of a plurality of layers of material which extend in a direction transverse to a length direction of the wall; and a plurality of first transition stiffener members each comprises a first wall member which is connected to and positioned to extend along a first end portion of the wall wherein each first transition stiffener member forms a tear drop shape boundary within the first wall member along the first end portion of the wall;

a plurality of second transition stiffener members each comprises a second wall member which is connected to and positioned to extend along a second end portion of the wall, wherein each second transition stiffener member forms a tear drop shape boundary within the second wall member along the second end portion of the wall;

a plurality of first stiffener members are connected to and positioned to extend along the first curved wall wherein at least one of the plurality of first stiffener members comprises at least one first wall member connected to the first curved wall which forms a boundary shape with the first curved wall; and a plurality of second stiffener members are connected to and positioned to extend along the second curved wall and around the second opening, wherein at least one of the plurality of second stiffener members comprises at least one second wall member connected to the second curved wall which forms a boundary shape with the second curved wall.

19. The vessel with grid stiffened structure of claim 18 wherein:

at least one elongated rib, of a first set of four elongated ribs, extends in a direction further away from the wall than a second elongated rib of a second set of four elongated ribs; and the at least one second wall member of the plurality of second stiffener members extends in a direction away from the second curved wall and in a direction along the second curved wall non-tangential to the second opening.

20. The vessel with grid stiffened structure of claim 18 comprises at least one of:

a set of four elongated ribs which form the parallelogram boundary shape, wherein at least two of the set of four elongated ribs each define at least one bore at a first location and at a second location extending through the at least two of the four elongated ribs providing a flow path from outside the set of four elongated ribs at the first location, into within the parallelogram boundary shape and out of the parallelogram boundary shape at the second location to outside of the set of the four elongated ribs;

the first wall member of the plurality of first transition stiffener members defines a bore positioned in a first location and in a second location extending through the first wall member providing a flow path from outside the first wall member at the first location into within the tear drop shape boundary and out of the tear drop shape boundary through first wall member at the second location;

the second wall member of the plurality of second transition stiffener members defines a bore positioned in a first location and a second location extending through the second wall member providing a flow path from outside the second wall member at the first location into within the tear drop shape boundary and out of the tear drop shape boundary through the second wall member at the second location;

the at least one first wall member of the plurality of first stiffener members defines a bore positioned in a first location and in a second location extending through the at least one first wall member providing a flow path from outside of the first stiffener member into, at the first location, into and within the boundary shape and out of the boundary shape through the at least one first wall member at the second location; and the at least one second wall member of the plurality of second stiffener members defines a bore positioned in a first location and a second location extending through the at least one second wall member providing a flow path from outside of the second stiffener member into, at the first location, and within the boundary shape and out of the boundary shape through the at least one second wall member at the second location.

21. The vessel with grid stiffened structure of claim 18 further comprises at least one of:

an elongated rib of the plurality of elongated ribs defines a trough which extends in a direction along a length of the elongated rib;

a first stiffener member of the plurality of first stiffener members defines a trough which extends along a length of the first stiffener member;

a second stiffener member of the plurality of second stiffener members defines a trough which extends along a length of the second stiffener member;

a first transition stiffener member of the plurality of first transition stiffener members defines a trough which extends along the first transition stiffener member; and a second transition stiffener member of the plurality of second transition stiffener members defines a trough which extends along the second transition stiffener member.

22. The vessel with grid stiffened structure of claim 18 further comprises:

a second wall connected to at least a portion of the plurality of elongated ribs positioning the at least a portion of the plurality of elongated ribs between the wall and the second wall and forming a pocket defined by a set of the plurality of sets of four elongated ribs, the wall and the second wall; and one of a pressure transducer resistor, capacitive fluid and water positioned within the pocket.

\* \* \* \* \*